US010330268B2

(12) United States Patent
Shah et al.

(10) Patent No.: US 10,330,268 B2
(45) Date of Patent: Jun. 25, 2019

(54) SSL RETROFIT FIXTURE

(71) Applicant: EPISTAR CORPORATION, Hsinchu (TW)

(72) Inventors: Ashok Deepak Shah, Atlanta, GA (US); Praneet Jayant Athalye, Morrisville, NC (US); Christopher Lee Whitworth, Mooresville, NC (US); Frederic Perry Phillips, Wuzhong (CN)

(73) Assignee: EPISTAR CORPORATION, Hsinchu (TW)

( * ) Notice: Subject to any disclaimer, the term of this patent is extended or adjusted under 35 U.S.C. 154(b) by 0 days.

(21) Appl. No.: 15/497,062

(22) Filed: Apr. 25, 2017

(65) Prior Publication Data

US 2017/0307143 A1    Oct. 26, 2017

Related U.S. Application Data

(60) Provisional application No. 62/327,221, filed on Apr. 25, 2016.

(51) Int. Cl.
*F21K 9/68* (2016.01)
*F21K 9/235* (2016.01)
*F21K 9/69* (2016.01)
*F21K 9/237* (2016.01)
*F21K 9/90* (2016.01)
(Continued)

(52) U.S. Cl.
CPC ............. *F21K 9/68* (2016.08); *F21K 9/20* (2016.08); *F21K 9/235* (2016.08); *F21K 9/237* (2016.08); *F21K 9/69* (2016.08); *F21K 9/90* (2013.01); *F21S 8/026* (2013.01); *F21V 5/048* (2013.01); *F21V 7/041* (2013.01); *F21V 13/04* (2013.01); *F21V 21/04* (2013.01); *F21V 23/005* (2013.01); *F21V 23/006* (2013.01); *F21V 23/009* (2013.01); *H02G 3/16* (2013.01); *H02G 3/20* (2013.01); *F21V 5/04* (2013.01); *F21V 7/06* (2013.01); *F21V 17/007* (2013.01); *F21V 21/042* (2013.01); *F21V 23/045* (2013.01);
(Continued)

(58) Field of Classification Search
CPC ....................................................... F21S 8/026
See application file for complete search history.

(56) References Cited

U.S. PATENT DOCUMENTS

| 8,070,328 | B1 * | 12/2011 | Knoble | F21V 3/00 |
| | | | | 362/311.02 |
| 8,220,970 | B1 * | 7/2012 | Khazi | F21V 29/004 |
| | | | | 362/294 |
| 2010/0259919 | A1 * | 10/2010 | Khazi | F21S 8/026 |
| | | | | 362/84 |
| 2011/0074265 | A1 * | 3/2011 | Van De Ven | F21S 8/02 |
| | | | | 313/46 |
| 2011/0075414 | A1 * | 3/2011 | Van De Ven | F21V 15/01 |
| | | | | 362/235 |

(Continued)

*Primary Examiner* — Alexander K Garlen
(74) *Attorney, Agent, or Firm* — Patterson + Sheridan, LLP

(57) ABSTRACT

A downlight retrofit assembly includes a reflector, the reflector defining a top reflector end and a bottom reflector end, the reflector defining a reflector bore extending through the reflector from the top reflector end to the bottom reflector end, the reflector bore defining a top reflector aperture and a bottom reflector aperture; a lens, the lens attached to the reflector proximate the bottom reflector end, the lens covering the bottom reflector aperture; and a light engine, the light engine comprising a SSL source and PCB, the SSL source attached to the PCB, the light engine covering the top reflector aperture, the SSL source disposed within the top reflector aperture, the SSL source configured to emit light through the lens.

17 Claims, 6 Drawing Sheets

(51) Int. Cl.
  *F21S 8/02* (2006.01)
  *F21V 5/04* (2006.01)
  *F21V 7/04* (2006.01)
  *F21V 13/04* (2006.01)
  *F21V 21/04* (2006.01)
  *F21V 23/00* (2015.01)
  *H02G 3/16* (2006.01)
  *H02G 3/20* (2006.01)
  *F21K 9/20* (2016.01)
  *F21V 7/06* (2006.01)
  *F21V 17/00* (2006.01)
  *H02G 3/12* (2006.01)
  *F21V 23/04* (2006.01)
  *F21Y 115/10* (2016.01)
  *F21Y 115/15* (2016.01)

(52) U.S. Cl.
  CPC ........ *F21Y 2115/10* (2016.08); *F21Y 2115/15* (2016.08); *H02G 3/123* (2013.01)

(56) References Cited

U.S. PATENT DOCUMENTS

| | | | |
|---|---|---|---|
| 2011/0075423 A1* | 3/2011 | Van De Ven | F21V 17/02 362/249.02 |
| 2013/0010476 A1* | 1/2013 | Pickard | F21S 8/026 362/311.03 |
| 2013/0271982 A1* | 10/2013 | Rodriguez | F21V 15/01 362/235 |
| 2013/0286646 A1* | 10/2013 | Snell | F21V 13/04 362/231 |
| 2013/0294084 A1* | 11/2013 | Kathawate | F21S 8/026 362/294 |
| 2014/0111984 A1* | 4/2014 | Rodgers | F21V 5/005 362/231 |
| 2015/0233537 A1* | 8/2015 | Athalye | F21S 8/026 362/147 |
| 2017/0307198 A1 | 10/2017 | Shah | |
| 2017/0311399 A1 | 10/2017 | Shah | |

* cited by examiner

SSL RETROFIT FIXTURE

CROSS-REFERENCE TO RELATED APPLICATIONS

This application claims the benefit of U.S. Provisional Application No. 62/327,221, filed on Apr. 25, 2016, which is hereby incorporated by reference in its entirety.

TECHNICAL FIELD

This disclosure relates to light fixtures. More specifically, this disclosure relates to solid-state lighting downlight fixtures.

BACKGROUND

Many existing household lighting fixtures and commercial lighting fixtures are incandescent light bulb fixtures comprising an Edison screw socket. Incandescent light bulbs operate at very low luminous efficiency compared to solid-state lighting ("SSL") sources, such as light-emitting diodes ("LEDs"), organic light-emitting diodes ("OLEDs"), polymer light-emitting diodes ("PLEDs") and the like. Incandescent light bulbs also have very short lifespans compared to common SSL sources. Because of the benefit of increased power efficiency and bans on traditional incandescent lighting by government bodies in some areas, it can be desirable to convert or retrofit existing incandescent light bulb fixtures to SSL sources without requiring complete replacement of the existing lighting fixture.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

Disclosed is a downlight retrofit assembly comprising a reflector, the reflector defining a top reflector end and a bottom reflector end, the reflector defining a reflector bore extending through the reflector from the top reflector end to the bottom reflector end, the reflector bore defining a top reflector aperture and a bottom reflector aperture; a lens, the lens attached to the reflector proximate the bottom reflector end, the lens covering the bottom reflector aperture; and a light engine, the light engine comprising a SSL source and PCB, the SSL source attached to the PCB, the light engine covering the top reflector aperture, the SSL source disposed within the top reflector aperture, the SSL source configured to emit light through the lens.

Also disclosed is a light engine comprising a PCB, the PCB defining a top PCB surface and a bottom PCB surface, the PCB comprising an SSL source and a pair of PCB contacts, the pair of PCB contacts connected in electrical communication with the SSL source, the SSL source disposed on the bottom PCB surface; and a cover, the cover defining a top cover surface and a bottom cover surface, the cover defining a PCB cavity recessed into the top cover surface, the PCB disposed within the PCB cavity, the top PCB surface substantially flush with the top cover surface, the cover defining a light aperture extending through the cover, the light aperture receiving the SSL source.

Also disclosed is a method of manufacturing a downlight retrofit assembly, the method comprising mounting a light engine to a backing plate, the light engine comprising a PCB and a cover, the PCB enclosed between the cover and the backing plate; attaching the backing plate to a top reflector end of a reflector, the light engine positioned between the backing plate and the reflector, the PCB comprising an SSL source configure to emit light, the SSL source aligned with a top reflector aperture of the reflector; and attaching a lens to a bottom reflector end of the reflector, the lens covering a bottom reflector aperture of the reflector, a reflector bore extending between the top reflector aperture and the bottom reflector aperture.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The features and components of the following figures are illustrated to emphasize the general principles of the present disclosure. The drawings are not necessarily drawn to scale. Corresponding features and components throughout the figures may be designated by matching reference characters for the sake of consistency and clarity.

DETAILED DESCRIPTION

Figure 1:
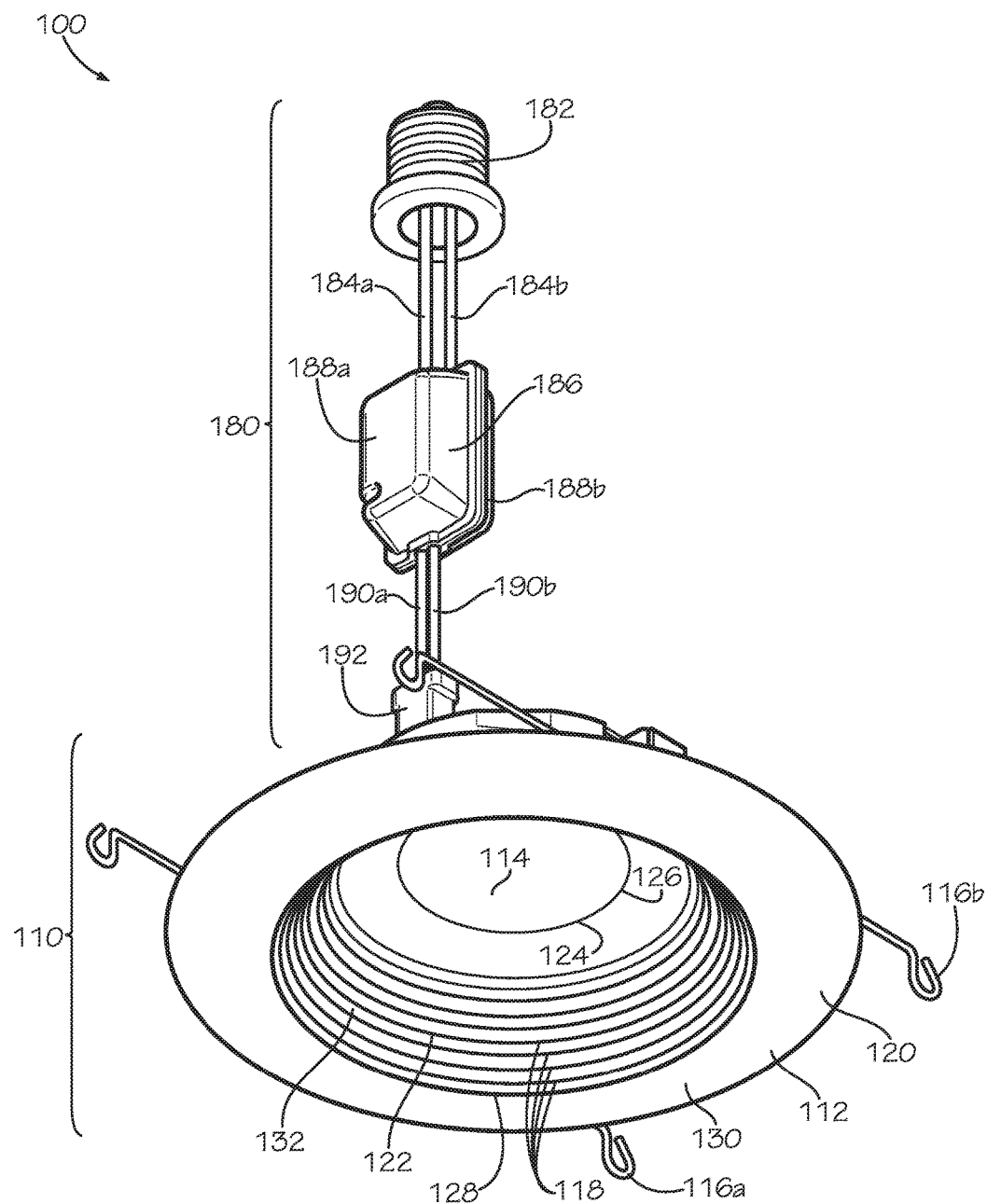
FIG. 1 is a bottom perspective view of a retrofit downlight conversion assembly comprising a downlight retrofit assembly and an inline driver module in accordance with one aspect of the current disclosure.

The present disclosure can be understood more readily by reference to the following detailed description, examples, drawings, and claims, and the previous and following description. It is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

According to some aspects, a retrofit downlight conversion assembly is disclosed along with associated methods, systems, devices, and various apparatus. The retrofit downlight conversion assembly comprises a downlight retrofit assembly and an inline driver module. It would be understood by one of skill in the art that the disclosed retrofit downlight conversion assembly is described in but a few exemplary embodiments among many. No particular terminology or description should be considered limiting on the disclosure or the scope of any claims issuing therefrom.

FIG. 1 is a bottom perspective view of a retrofit downlight conversion assembly 100 in accordance with one aspect of the present disclosure. The retrofit downlight conversion assembly 100 can comprise a downlight retrofit assembly 110 and an inline driver module 180. The retrofit downlight conversion assembly 100 can be configured to retrofit a common incandescent downlight fixture (not shown), also called a recessed light, pot light, or can light, to an SSL source. In the present aspect, the downlight retrofit assembly 110 can comprise an SSL source, such as an LED, PLED, or OLED, and the downlight retrofit assembly 110 can be configured to fit within a recessed housing (not shown) of the common incandescent downlight fixture.

The downlight retrofit assembly 110 can comprise a trim piece 112. The trim piece 112 can define a top trim end 126 and a bottom trim end 130. The trim piece 112 can define a trim bore 122 extending through the trim piece 112 from the top trim end 126 to the bottom trim end 130. The trim bore 122 can define a top trim aperture 124 disposed at the top trim end 126 and a bottom trim aperture 128 disposed at the bottom trim end 130. The trim bore 122 can define a trim bore surface 132 extending between the top trim aperture 124 and the bottom trim aperture 128. The trim piece 112 can define a circumferential lip 120 disposed radially external to the bottom trim aperture 128.

The downlight retrofit assembly 110 can further comprise a lens 114 disposed within the trim bore 122 of the trim piece 112. The lens 114 can be centered within the top trim aperture 124 of the trim piece 112. In the present aspect, the trim piece 112 can be a stepped baffle trim piece, and the trim bore surface 132 can define a plurality of concentric rings 118 configured to reduce glare and "soften" light emitted through the lens 114. The lens 114 can also be configured to reduce glare and soften emitted light by providing an opaque or frosted finish on the lens 114. In other aspects, the lens 114 can be clear. In some aspects, the trim piece 112 may not be the baffled trim piece, and the trim bore surface 132 can define a smooth surface. In the present aspect, the trim bore surface 132 can define a frustoconical surface; however, in other aspects, the trim bore surface 132 can define a parabolic, spherical segment, or any other suitable shape. In some aspects, the lens 114 can cover the bottom trim aperture 128.

The downlight retrofit assembly 110 can comprise a pair of torsion springs 116a,b configured to retain the downlight retrofit assembly 110 within the recessed housing of the common incandescent downlight fixture (not shown). The torsion springs 116a,b can comprise spring steel, hardened stainless steel, or nickel or chrome plated steel, for example and without limitation. The torsion springs 116a,b can be biased to extend outwards from the downlight retrofit assembly 110, and the torsion springs 116a,b can exert a force on the recessed housing which retains the downlight retrofit assembly 110. Various retention mechanisms for securing downlight assemblies within recessed housings are well known, and the torsion springs 116a,b should not be viewed as limiting. In other aspects, the downlight retrofit assembly 110 can comprise a different retention mechanism, such as sheet metal retention tabs. When installed within the recessed housing, the circumferential lip 120 can be sized and shaped to cover an opening of the recess housing to provide a visually pleasing appearance and improve aesthetics of the housing.

The inline driver module 180 can be configured to convert alternating current ("AC") power supplied by the common incandescent downlight fixture to direct current ("DC") power to power the SSL source. The inline driver module 180 can comprise a convertor plug 182 configured to electrically connect to a socket (not shown) of the common incandescent downlight fixture. In the present aspect, the convertor plug 182 can be an Edison plug configured to electrically connect to an Edison socket of the common incandescent downlight fixture in place of an incandescent light bulb. The Edison socket can be an E26 socket under Underwriter Laboratories ("UL") 496, entitled "Lampholders", Sep. 30, 2008 edition, as published and maintained by Underwriters Laboratories LLC, headquartered in 333 Pfingsten Road, Northbrook, Ill. 60062, United States of America. In other aspects, the convertor plug 182 can be a two-prong plug, a three-prong plug, or any other type of plug configured to engage and electrically connect with the socket of an AC power source.

The convertor plug 182 can be connected by a first wire 184a and a second wire 184b to a light driver circuit (not shown) disposed within a driver housing 186. The light driver circuit can be a LED driver, configured to convert AC power to DC power. In some aspects, the light driver circuit can comprise digital logic circuitry to control voltage, amperage, frequency, wave form shape, and/or the like of the DC power output. In some aspects, the light driver circuit can further comprise a communication module so that the light driver circuit can be remotely controlled, such as by a Wi-Fi signal. For example, the light driver circuit can be remotely instructed to turn the downlight retrofit assembly 110 on or off, to increase or decrease the light output of the downlight retrofit assembly 110, or to change a color of light emitted from the downlight retrofit assembly 110. In the present aspect, the light driver circuit can be a printed circuit board ("PCB").

In the present aspect, the first wire 184a can be a neutral wire, and the second wire 184b can be a phase wire. The first wire 184a and the second wire 184b can deliver AC power from the convertor plug 182 to the light driver circuit. In other aspects, the convertor plug 182 can be connected to the light driver by more than two wires, such as in a grounded application, or by a cable or conduit comprising phase and neutral feeds. The converted DC power can be supplied to the downlight retrofit assembly 110 from the light driver circuit through a third wire 190a and a fourth wire 190b attached to a convertor connector 192. The convertor connector 192 can be a female DC/AC luminaire disconnect under the UL 2459 standard entitled "Insulated Multi-Pole Splicing Wire Connectors, Aug. 22, 2008 edition. In some aspects, the inline driver module 180 may not comprise either or both of the convertor plug 182 and the convertor connector 192, and the adjacent wires 184a,b and/or 190a,b can define a stripped end. In some aspects, the downlight retrofit assembly 110 can be connected to the light driver circuit by more than two wires, such as in a multi-color application. In the present aspect, the wires 184a,b,190a,b can be 18 American wire gauge ("AWG") wires; however in other aspects, the wires 184a,b,190a,b can be larger or smaller than 18AWG, and the wires 194a,b,190a,b can differ from one another in thickness.

The driver housing 186 can comprise a first shell 188a and a second shell 188b configured to seal around the wires 184a,b,190a,b to enclose, protect, and insulate the light driver circuit and electrical connections between the wires 184a,b,190a,b and the light driver circuit.

In the present aspect, the driver housing 186 can be rated as 5VA flame retardation classification under the UL 94 standard entitled "Standard for Safety of Flammability of Plastic Materials for Parts in Devices and Appliances," Mar. 28, 2013 edition. Under the 5VA flame retardation classification and the UL 1598 standard entitled "Luminaires", Sep. 17, 2008 edition, the first shell 188a and the second shell 188b can comprise 1.5 mm to 2.5 mm thick polybutylene terephthalate ("PBT"), containing 0% to 30% glass fiber, 2.5 mm to 3 mm thick polycarbonate ("PC"), 2.5 mm to 3 mm thick acrylonitrile butadiene styrene ("ABS"), 2 mm to 3 mm thick PC and ABS hybrid plastic, or 2 mm to 3 mm thick ABS and PBT hybrid plastic, for example and without limitation. Under the UL 1993 standard entitled "Self-Ballasted Lamps and Lamp Adapters", Dec. 4, 2012 edition, first shell 188a and the second shell 188b can comprise 0.8 mm to 1.5 mm thick PBT, containing 0% to 30% glass fiber, 1.5 mm thick PC, 1.5 mm to 2.5 mm thick ABS, 1.5 mm to 2.5 mm thick PC and ABS hybrid plastic, or 1.5 mm to 2.5 mm thick ABS and PBT hybrid plastic, for example and without limitation.

In other aspects, the driver housing 186 can comprise other materials. In other aspects, the driver housing 186 can be rated at a different flame retardation classification. In other aspects, the driver housing 186 can comprise overmolded metal wherein a metal sub-frame is coated with a plastic, such as polyethylene, polypropylene, silicon, thermoplastic rubber, thermoplastic elastomers, or any other suitable material. The metal sub-frame can comprise a metal such as aluminum, steel, copper, or any other suitable metal which can be formed by stamping, casting, machining, forging, or any other suitable method of manufacturing. A portion of the metal sub-frame may be left exposed (i.e., not over-molded) in order to dissipate heat from internal components.

In other aspects, the driver housing can comprise two injection molded thermoplastics polymers with either amorphous molecular structure, such as ABS or PC, or semi-crystalline molecular structure, such as nylon or polyester, for example and without limitation. The first shell 188a and the second shell 188b can be joined together with ultrasonic welding, clips, screws, or plastic spot welding, or other suitable methods.

Figure 2:
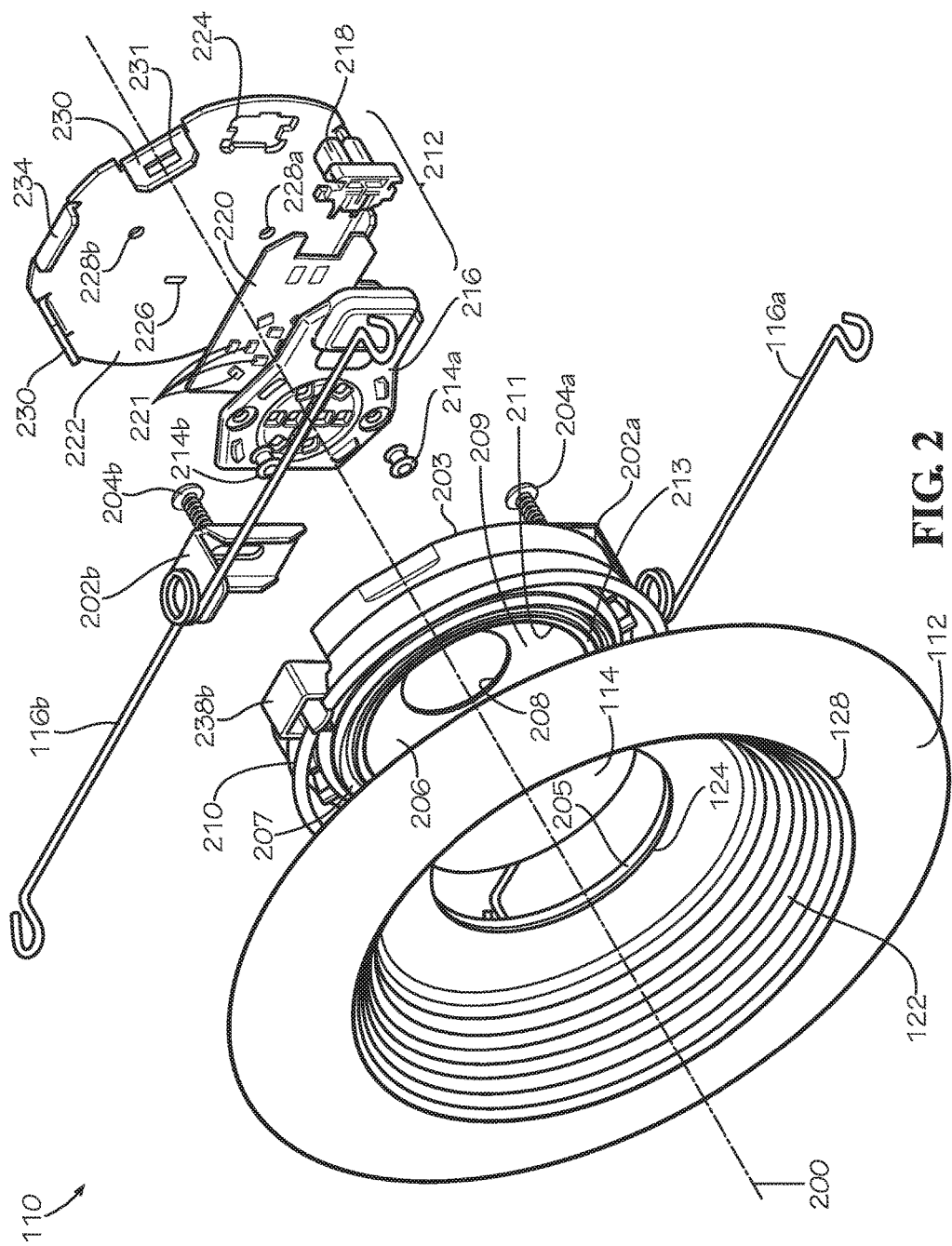
FIG. 2 is an exploded view of the downlight retrofit assembly of FIG. 1 comprising a light engine, a backing plate, a trim piece, a lens, and a reflector.

FIG. 2 is an exploded view of the downlight retrofit assembly 110 of FIG. 1. In the present aspect, the downlight retrofit assembly 110 can further comprise a reflector 210, a light engine 212, and a backing plate 222. The light engine 212 can comprise a PCB 220, a cover 216, and a PCB connector 218. In the present aspect, the PCB 220 can be a metal core printed circuit board ("MCPCB"); however in other aspects, the PCB 220 may not comprise a metal core. The PCB 220 can comprise a plurality of SSL sources 221 mounted on the PCB 220. In the present aspect, each SSL source 221 can be an LED; however in other aspects, each SSL source 221 can be another light source such as an OLED or PLED. In some aspects, some of the SSL sources 221 can differ from one another. In some aspects, the SSL sources 221 can be configured to emit light at different wave lengths. For example and without limitation, some of the SSL sources 221 can be configured to emit red light and some of the SSL sources 221 can be configured to emit white light. The PCB connector 218 can be configured to attach to an end of the PCB 220, and the PCB connector 218 can also be configured to attach to the convertor connector 192 (shown in FIG. 1) to receive power from the inline driver module 180 (shown in FIG. 1).

The backing plate 222 can define a connector hole 224 extending through the backing plate 222. The connector hole 224 can be sized and shaped to closely receive the PCB connector 218 of the light engine 212. The backing plate 222 can also define a pair of plate fastener holes 228a,b and a retention tab hole 226, each extending through the backing plate 222. The plate fastener holes 228a,b can be sized and positioned to receive a pair of fasteners 214a,b which can secure the light engine 212 against the backing plate 222. In the present aspect, the fasteners 214a,b can be rivets, such as aluminum or stainless steel pop rivets, configured to permanently attach the light engine 212 to the backing plate 222; however in other aspects, the fasteners 214a,b can be other fasteners such as screws, bolts, nuts, studs, blind rivets, plastic stacking with either rosette profile, dome stack profile, hollow stack profile, knurled stack profile, or flush stake profile, or any other suitable fasteners, and in some aspects, the fasteners 214a,b can be removable.

The cover 216 can be configured to enclose the PCB 220 between the cover 216 and the backing plate 222 with only the plurality of SSL sources 221 exposed through the cover 216. With the cover 216, the PCB 220, and the PCB connector 218 secured against the backing plate 222, a portion of the PCB connector 218 can extend through the connector hole 224 of the backing plate 222. In the present aspect, the backing plate 222 can comprise a metal such as aluminum, for example 6061 aluminum, 6063 aluminum, or 1060 aluminum, low carbon steel, stainless steel, copper, brass, or any other suitable metal. In other aspects, the backing plate 222 can comprise a thermally conductive plastic such as polyamide, ABS, or carbon-filled PC, for example and without limitation. The backing plate 222 can be formed from a method such as deep drawing or by a progressive die. In other aspects, the cover 216 and backing plate 222 can comprise other materials.

A plurality of locking tabs 230 can be formed in the backing plate 222. The locking tabs 230 can extend outwards substantially perpendicular to the backing plate 222, and each locking tab 230 can be received by a locking pocket 830 (shown in FIG. 8) defined by the reflector 210. The locking tabs 230 can be configured to secure the backing plate 222 to the reflector 210 and to secure the light engine 212 between the backing plate 222 and the reflector 210. The locking tabs 230 can each define an opening 231 configured to receive a spring tab (not shown) within the respective locking pocket 830 to prevent withdrawal of the locking tabs 230 from the locking pockets 830 once inserted.

The reflector 210 can define a pair of spring mounting shoulders 238a,b (spring mounting shoulder 238a shown in FIG. 9) extending radially outwards from the reflector 210. Each torsion spring 116a,b can be attached to a spring bracket 202a,b, respectively, and the spring brackets 202a,b can be configured to attach to the respective spring mounting shoulders 238a,b with a fastener 204a,b. The spring brackets 202a,b can slide radially inward and outward to fit the recessed housing of the common downlight incandescent fixture (not shown) with a diameter ranging from 125 mm to 165 mm, and the fasteners 204a,b can secure the spring brackets 202a,b to prevent further sliding. In other aspects, the spring brackets 202a,b can be configured to be compatible with recessed housings with a diameter smaller than 125 mm or greater than 165 mm. In the present aspect, the fasteners 204a,b can be screws; however in other applications, the fasteners 204a,b can be rivets, bolts, nuts, studs, or any other suitable fasteners. In other aspects, friction clips (not shown) can be attached to the spring brackets 202a,b.

A portion of each spring bracket 202a,b can extend radially inwards between the reflector 210 and the backing plate 222, and a pair of tabs 234 can be attached to the backing plate 222 to cover a gap between the springs brackets 202a,b and the backing plate 222 and hold down the spring brackets 202a,b. The tabs 234 can further enclose the light engine 212 between the backing plate 222 and the reflector 210. In some aspects, a heat sink can be attached to the reflector 210 to promote cooling of the light engine 212 and a compartment formed between the reflector 210 and the backing plate 222. In the present aspect, the metal backing plate 222 can conduct heat away from the light engine 212 to promote cooling of the light engine 212 and the compartment.

The reflector 210 can define a top reflector end 203 and a bottom reflector end 213, and the reflector 210 can define a reflector bore 209 extending through the reflector 210 from the top reflector end 203 to the bottom reflector end 213. The reflector bore 209 can define a reflector bore axis 200. The reflector bore 209 can define a top reflector aperture 208 at the top reflector end 203 and a bottom reflector aperture 211 at the bottom reflector end 213. The top reflector aperture 208 can be defined radially inward with respect to the reflector bore axis 200 from the bottom reflector aperture 211, and the reflector bore 209 can widen from the top reflector end 203 to the bottom reflector end 213.

The light engine 212 can be a discrete unit which can be manufactured separately from other components of the downlight retrofit assembly 110. The backing plate 222 and the reflector 210 can be configured to accept various types of light engines 212 without requiring revision or change to the reflector 210 and backing plate 222. Modularity of the backing plate 222, light engine, and the reflector 210 can minimum part produce and reduce production costs. Additionally, the modularity facilitates upgrade, advancement, and improvement to the light engine 212 without requiring modification to other components of the downlight retrofit assembly 110.

The exposed SSL sources 221 of the light engine 212 can be aligned with the top reflector aperture 208 of the reflector 210. The reflector 210 can also define a groove 207 defined concentric to the top reflector aperture 208 and positioned radially outward from the top reflector aperture 208. The groove 207 can be configured to receive a collar 205 of the trim piece 112 to secure the lens 114 between the reflector 210 and the trim piece 112 as further shown and described with respect to FIG. 10. In the present aspect, the trim bore 122 can be coaxial to the reflector bore axis 200. The top trim aperture 124 can be defined radially outward from the bottom reflector aperture 211, and the bottom trim aperture 128 can be defined radially outward from the top trim aperture 124. In some aspects the top trim aperture 124 can be substantially equal in diameter to the bottom reflector aperture 211.

The reflector bore 209 can define a reflector bore surface 206 extending between the top reflector aperture 208 and the bottom reflector aperture 211. The reflector bore surface 206 can be configured to direct emitted light from the SSL sources 221 through the lens 114. In the present aspect, the reflector bore surface 206 can be parabolic; however, in other aspects, the reflector bore surface 206 can define a frustoconical or spherical segment shape.

Figure 3:
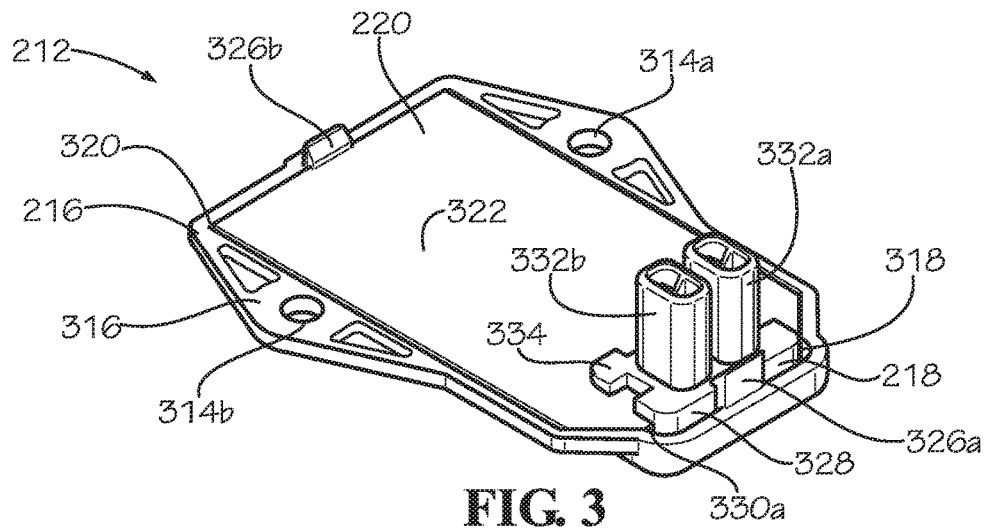
FIG. 3 is a top perspective view of the light engine of FIG. 2.

FIG. 3 is a perspective top view of the light engine 212 of FIG. 2. The cover 216 can define a top cover surface 316 and a PCB cavity 320 recessed below the top cover surface 316. The PCB cavity 320 can be shaped and sized complimentary to the PCB 220, and a top PCB surface 322 defined by the PCB 220 can be positioned substantially flush with the top cover surface 316 when the PCB 220 is positioned within the PCB cavity 320. The cover 216 can further define a connector cavity 318 shaped and sized complimentary to a connector base 328 of the PCB connector 218. The connector base 328 can define a pair of connector notches 330a,b (connector notch 330b shown in FIG. 6), and the connector notches 330a,b can each receive a portion of the PCB 220. A pair of connector extensions 332a,b can extend upwards from the connector base 328.

The cover 216 can comprise a pair of retention tabs 326a,b. The retention tab 326a can snap over the connector base 328 of the PCB connector 218 to secure the PCB connector 218 within the connector cavity 318. The retention tab 326b can snap over the top PCB surface 322 to secure the PCB 220 within the PCB cavity 320. The retention tab hole 226 of the backing plate 222 (shown in FIG. 2) can be configured to provide clearance for the retention tab 326b. In other aspects, the retention tab hole 226 can be threaded with metric or imperial threading to receive a fastener configured to retain the light engine 212 to the backing plate 222. The connector hole 224 of the backing plate 222 (shown in FIG. 2) can be configured to provide clearance for the retention tab 326a, the connector extensions 332a,b, and a top portion 334 of the connector base 328.

The cover 216 can further define a pair of cover fastener holes 314a,b extending through the cover 216. The cover fastener holes 314a,b can align with the plate fastener holes 228a,b, respectively, of the backing plate 222 (shown in FIG. 2), and the cover fastener holes 314a,b and the plate fastener holes 228a,b can receive the fasteners 214a,b (shown in FIG. 2) to mount and secure the light engine 212 to the backing plate 222. The fasteners 214a,b can be configured to provide residual pressure between the PCB 220 and the backing plate 222 to promote efficient thermal contact and heat transfer from the PCB 220 to the backing plate 222. In some aspects, thermally conductive material can be applied between the top PCB surface 322 and the backing plate 222 to promote heat transfer from the PCB 220 to the backing plate 222, thereby promoting cooling and heat dissipation from the PCB 220. In some applications, the backing plate 222 can be painted or coated to improve heat dissipation by radiation. In other aspects, the backing plate 222 can define cooling fins. In some aspects, the light engine 212 may not comprise a separate backing plate 222, and the backing plate 222 can be defined by an enlarged aspect of the PCB 220. In such aspects, the PCB 220 can be the MCPCB.

Figure 4:
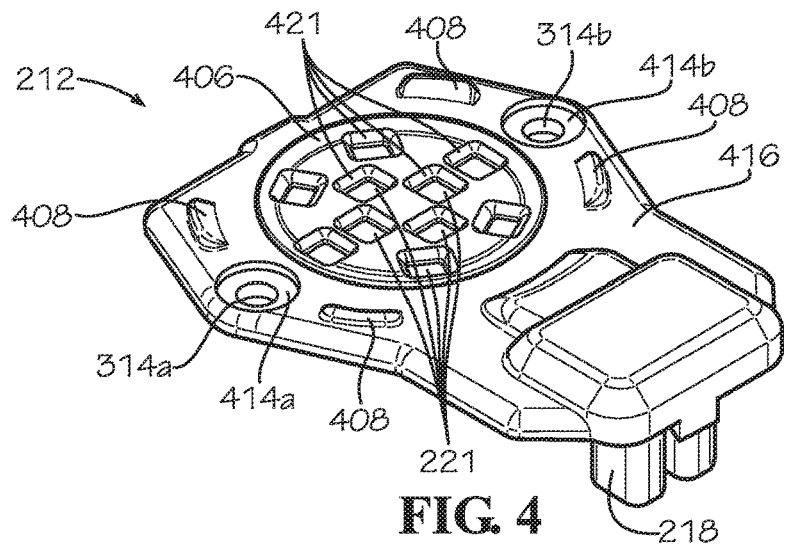
FIG. 4 is a bottom perspective view of the light engine of FIG. 2.

FIG. 4 is a bottom perspective view of the light engine 212. The cover 216 can define a bottom cover surface 416 disposed opposite from the top cover surface 316 (shown in FIG. 3). Each cover fastener hole 314a,b can extend through the cover 216 from the top cover surface 316 to the bottom cover surface 416. The bottom cover surface 416 can define a countersunk shoulder 414a,b around the cover fastener holes 314a,b, respectively.

The cover 216 can further define a raised ring 406 and a plurality of raised shoulders 408. A plurality of light apertures 421 can be defined extending through the cover 216. The plurality of light apertures 421 can be disposed within the raised ring 406, and arranged according to a distribution of the plurality of SSL sources 221 mounted to the PCB 220 (shown in FIG. 3). In the present aspect, the SSL sources 221 can be distributed in an asterisk shape; however in other aspects, the SSL sources 221 can be arranged in a circular shape, an X shape, a grad pattern, or any other suitable shape or pattern.

Each light aperture 421 can be configured to receive a different one of the SSL sources 221, and each light aperture 421 can be shaped and sized complimentary to a one of the SSL sources 221. The light apertures 421 can closely fit the respective SSL sources 221 to dielectrically insulate the SSL sources 221 and circuitry of the PCB 220. In the present aspect, a gap between the light apertures 421 and the SSL sources 221 can be less than 1 mm in width. The raised ring 406 and the raised shoulders 408 can cooperate to center and align the SSL sources 221 of the light engine 212 relative to the top reflector aperture 208 of the reflector 210 (shown in FIG. 2). In an assembled configuration, the top reflector aperture 208 can be radially positioned between the raised ring 406 and the raised shoulders 408 relative to the reflector bore axis 200 (shown in FIG. 2).

Figure 5:
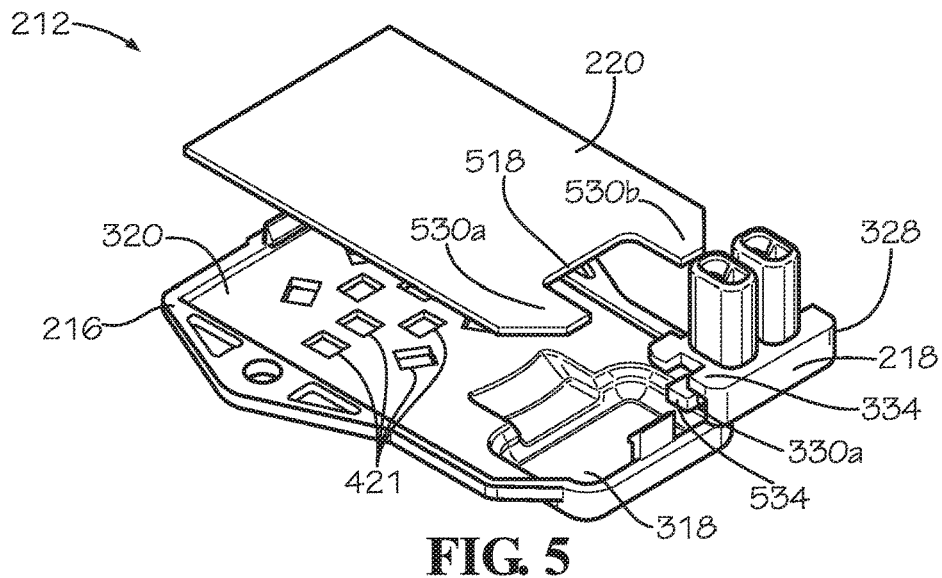
FIG. 5 is an exploded top view of the light engine of FIG. 2.
Figure 6:
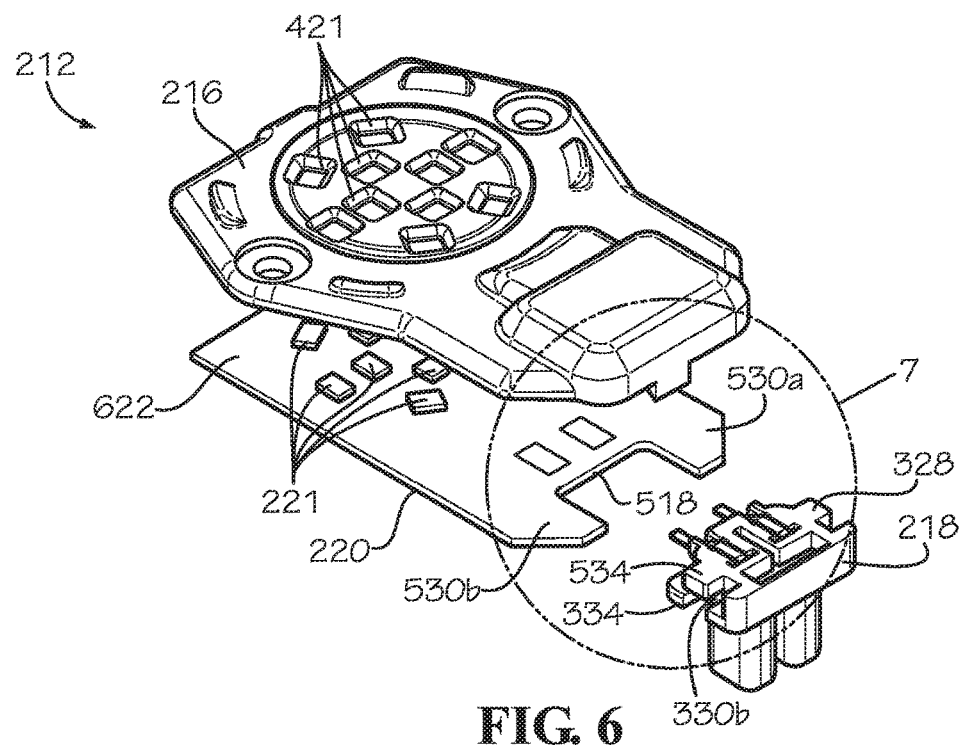
FIG. 6 is an exploded bottom view of the light engine of FIG. 2.

FIG. 5 is an exploded top view of the light engine 212, and FIG. 6 is an exploded bottom view of the light engine 212. The PCB cavity 320 and the connector cavity 318 are shown with the PCB 220 and the PCB connector 218 removed from the cover 216. The plurality of SSL sources 221 can be disposed on a bottom PCB surface 622 of the PCB 220. The PCB 220 can define a PCB notch 518 defined between a first wing 530a and a second wing 530b. The connector notch 330a (shown in FIG. 5) is configured to receive the first wing 530a of the PCB 220, and the connector notch 330b (shown in FIG. 6) is configured to receive the second wing 530b. The connector base 328 can fit within the PCB notch 518. Engagement between the wings 530a,b and the connector notches 330a,b can secure the PCB connector 218 to the PCB 220. Each connector notch 330a,b can be defined between the top portion 334 and a bottom portion 534 of the connector base 328 of the PCB connector 218.

Figure 7:
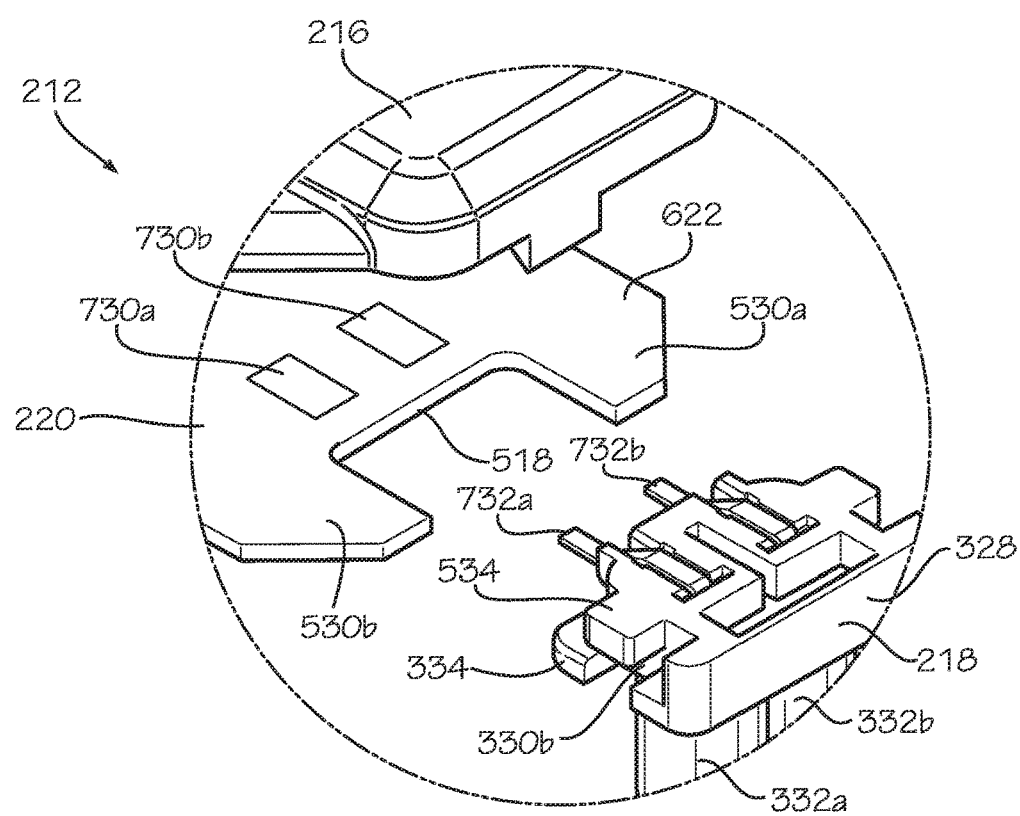
FIG. 7 is a detail view of the light engine of FIG. 2 taken from Detail 7 shown in FIG. 6.

FIG. 7 is a detail view of the light engine 212 taken from Detail 7 of FIG. 6. A pair of PCB contacts 730a,b can be disposed on the bottom PCB surface 622 of the PCB 220. The PCB contacts 730a,b can be connected in electrical communication with the SSL sources 221 to provide positive and negative DC power to the plurality of SSL sources 221 of the PCB 220. In the present aspect, the PCB connector 218 can be a through-board connector. The PCB connector 218 can comprise a pair of connector contacts 732a,b disposed on the bottom portion 534 of the connector base 328. The connector contact 732a can be in electrical communication with the connector extension 332a, and the connector contact 732b can be in electrical communication with the connector extension 332b. With the PCB connector 218 received within the PCB notch 518 of the PCB 220, the connector contacts 732a,b can be configured to engage the PCB contacts 730a,b, respectively, and connect the PCB 220 in electrical communication with the PCB connector 218. In the present aspect, the connector contacts 732a,b can engage the PCB contacts 730a,b under spring provided by the connector contacts 732a,b. In other aspects, the connector contacts 732a,b can be soldered to the PCB contacts 730a,b. In other aspects, the PCB connector 218 can be a surface mount connector.

In the present aspect, the plurality of SSL sources 221 and the PCB contacts 730a,b can be connected together in a single circuit. In other aspects, the PCB 220 can comprise more than two PCB contacts 730a,b, and the SSL sources 221 can be separated into multiple separate circuits. For example and without limitation, a first group of SSL sources 221 can be electrically connected in a first circuit, and a second group of SSL sources 221 can be electrically connect in a second circuit. The first group of SSL sources 221 can be configured to emit light of a first color, and the second group of SSL sources 221 can be configured to emit light of a second color. By controlling power distributed to the different circuits of the PCB 220, the light driver circuit (not shown) can control the light engine 212 to emit varying colors of light. In other aspects, the SSL sources 221 can be separated into greater than two distinct circuits.

Figure 8:
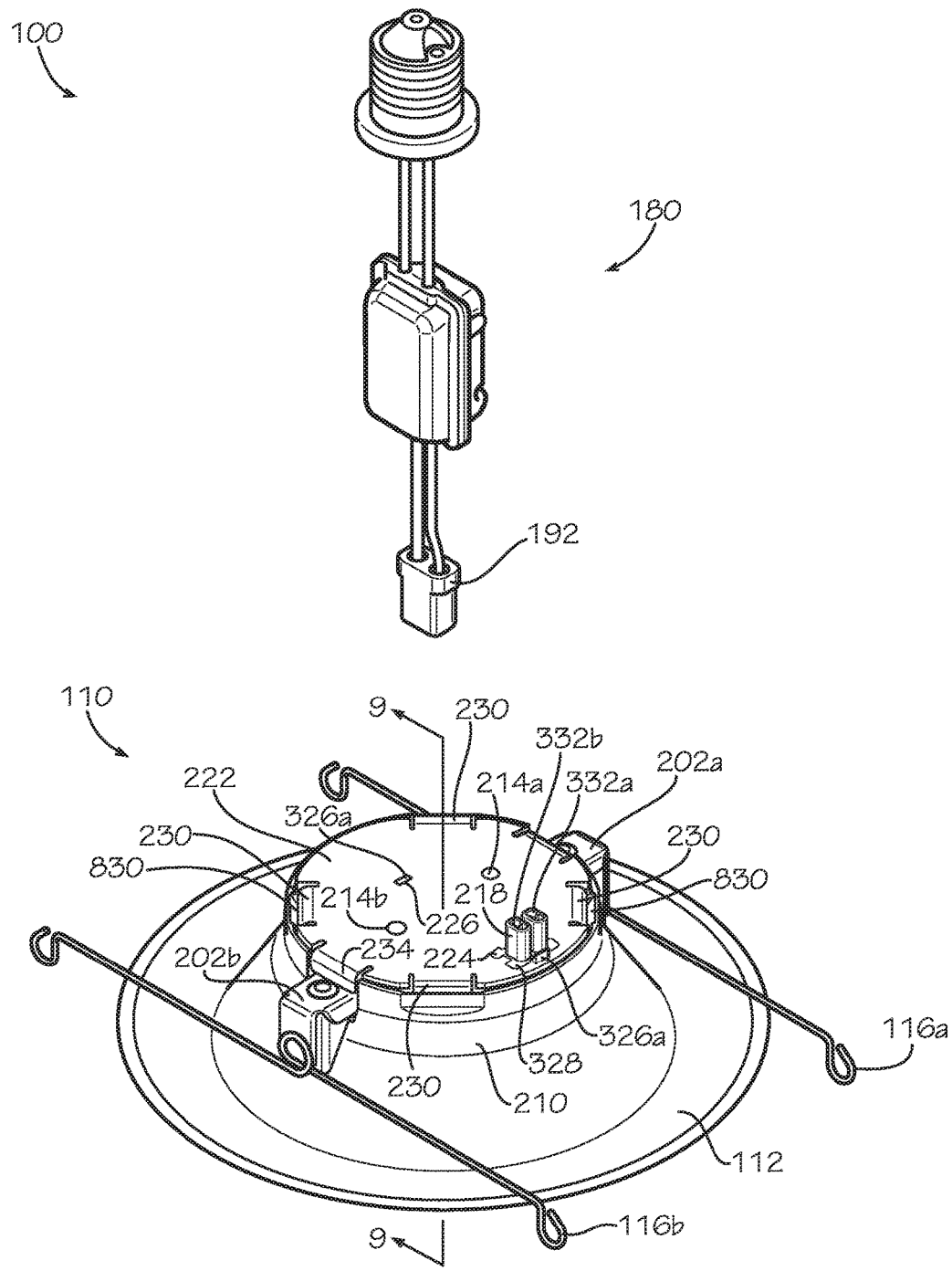
FIG. 8 is a top perspective view of the retrofit downlight conversion assembly of FIG. 1 with the inline driver module detached from the downlight retrofit assembly.

FIG. 8 is a top perspective view of the retrofit downlight conversion assembly 100 with the inline driver module 180 detached from the downlight retrofit assembly 110. The connector extensions 332a,b can extend upwards through the backing plate 222, and the top portion 334 of the PCB connector 218 can be positioned within the connector hole 224 and substantially flush with the backing plate 222. The retention tab 326a can also extend through the connector hole 224. The retention tab 326b can extend through the retention tab hole 226. In some aspects, the retention tabs 326a,b can also engage the backing plate 222 to secure the light engine 212 to the backing plate 222.

In the present aspect, the PCB connector 218 can be a male connector, and the connector extensions 332a,b can insert into the convertor connector 192 in order to connect the downlight retrofit assembly 110 in electrical communication with the inline driver module 180. In other aspects, the PCB connector 218 can be a female connector, and the connector extensions 332a,b can receive the convertor connector 192 of the inline driver module 180. In other aspects, the PCB connector 218 may not extend upwards through the backing plate 222. In such aspects, the PCB connector 218 can define recessed receptacles extending below the backing plate 222.

Figure 9:
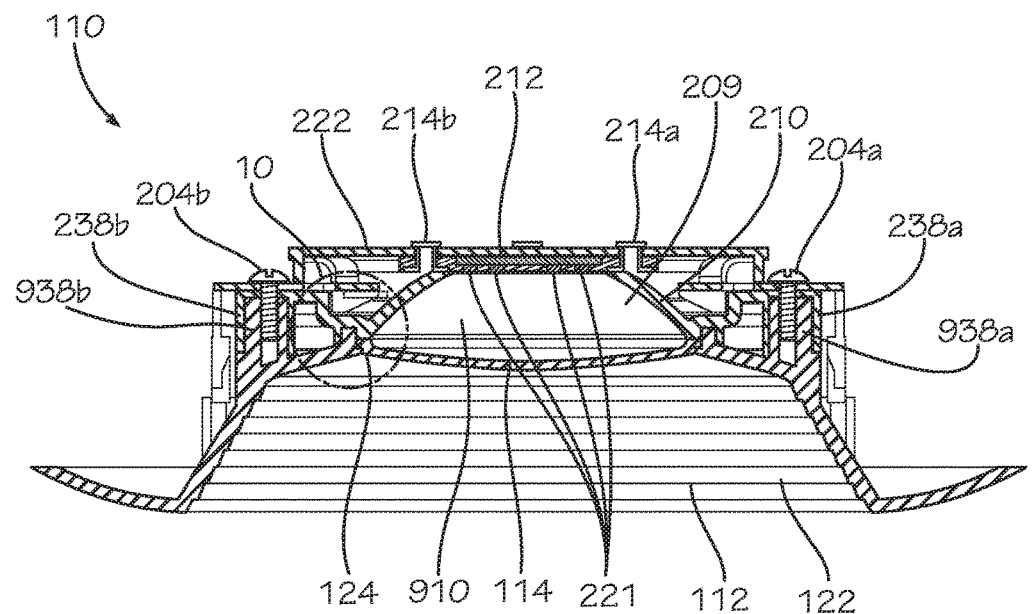
FIG. 9 is a cross-section of the downlight retrofit assembly of FIG. 1 taken along line 9-9 shown in FIG. 8.

FIG. 9 is a cross-section of the downlight retrofit assembly 110 taken along line 9-9 shown in FIG. 8. The lens 114, the reflector 210, and the backing plate 222 can define a compartment 910 within the downlight retrofit assembly 110. The SSL sources 221 can be disposed within the compartment 910. The trim piece 112 can define a pair of shoulder inserts 938a,b which can be received by the spring shoulders 238a,b of the reflector 210. The fasteners 204a,b can secure the shoulder inserts 938a,b within the spring shoulders 238a,b to secure the trim piece 112 to the reflector 210.

Figure 10:
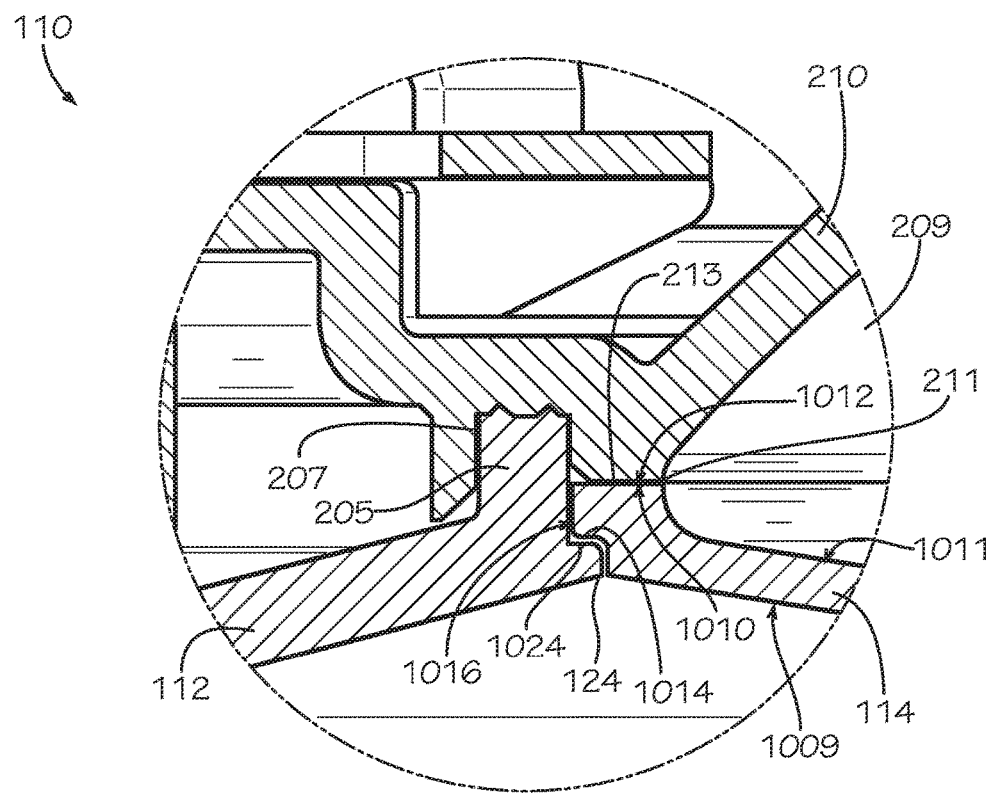
FIG. 10 is a detail view of the downlight retrofit assembly of FIG. 1 taken from Detail 10 shown in FIG. 9.

FIG. 10 is a detail view of the downlight retrofit assembly 110 taken from Detail 10 of FIG. 9. The bottom reflector end 213 can define a bottom reflector surface 1010 extending between the bottom reflector aperture 211 and the groove 207. The lens 114 can define a top lens surface 1012 positioned in facing contact with the bottom reflector surface 1010. The lens 114 can define an inner lens surface 1011 facing the compartment 910 and an outer lens surface 1009 facing outwards away from the compartment 910. The lens 114 can define an outer circumferential surface 1016 facing the collar 205 of the trim piece 112.

The groove 207 of the reflector 210 can receive the collar 205 of the trim piece 112 to secure the trim piece 112 to the reflector 210 with a tongue and groove joint. Engagement between the groove 207 and the collar 205 can center the trim piece 112 relative to the reflector bore 209 of the reflector 210. In the present aspect, the trim piece 112 can be ultrasonically welded to the reflector 210. In some aspects, the collar 205 can be sized and shaped to provide an interference fit with the groove 207, and engagement between the collar 205 and groove 207 can secure the trim piece 112 to the reflector 210. In some aspects, the collar 205 can be secured within the groove 207 by an adhesive such as an epoxy, glue, mastic, cement, or other suitable material. In some aspects, the collar 205 of the trim piece 112 can form a threaded connection with the groove 207 of the reflector 210.

The trim piece 112 can define a trim shoulder 1024 extending radially outwards from the top trim aperture 124 to the collar 205. The lens 114 can define a lens shoulder 1014 extending radially inwards from the outer circumferential surface 1016. The trim shoulder 1024 can engage the lens shoulder 1014 to form a step joint which centers the lens 114 within the top trim aperture 124 and secures the lens 114 between the trim piece 112 and the reflector 210.

In the present aspect, the trim piece 112 does not define the compartment 910. The compartment 910 can be enclosed between the light engine 212, the reflector 210, and the lens 114. Under UL 1598, the cover 216 can be rated 5VA fire retardation classification under UL 94 and can comprise 2.5 mm to 3 mm thick PC, 1.5 mm to 2.5 mm thick PBT containing 0% to 30% glass fiber, 2.5 mm to 3 mm thick ABS, 2 mm to 3 mm thick PC and ABS hybrid plastic, or 2 mm to 3 mm thick PC and PBT hybrid plastic, for example and without limitation. Because the trim piece 112 is not in direct contact with the compartment 910, the trim piece 112 is not required to dissipate heat from the light engine 212 and can be rated at a lower fire retardation classification than would otherwise be required if the trim piece 112 provided containment for the light engine 212. Consequently, the trim piece 112 can comprise cheaper materials and provide reduced manufacturing costs. In the present aspect, the SSL sources 221 can each be encapsulated in a flame retardant material.

Under UL1598, the trim piece 112 can comprise 1.5 mm to 2.5 mm thick ABS containing 8% to 15% $TiO_2$ and can be rated HB fire retardation classification, for example and without limitation. Under UL 1993, the trim piece 112 can comprise 1.5 mm thick PC and be rated HB fire retardation classification, for example and without limitation. The trim piece 112 can vary in outer diameter from 130 mm to 200 mm; however in other aspects, the trim piece 112 can define a larger or smaller outer diameter.

Under UL 1993, the reflector 210 can comprise 1.5 mm to 3 mm thick ABS and be rated HB fire retardation classification under UL 94. Under UL 1598, the reflector 210 can comprise 1.5 mm to 3 mm thick PC, 2 mm to 2.5 mm thick ABS and be rated VO fire retardation classification under UL 94, for example and without limitation. In other aspects, either or both of the trim piece 112 and the reflector 210 can comprise a material such as metal, PC, PBT, or any other suitable material.

For UL 1993, the lens 114 can comprise 1 mm to 1.5 mm thick PC for the V0 fire retardation classification under UL 94. For UL 1598, the lens 114 can comprise 3 mm thick polymethyl methacrylate ("PMMA") or 0.8 mm to 1.5 mm thick PC with an HB fire retardation classification under UL 94, for example and without limitation. In the present aspect, the lens 114 can define a clear finish; however in other aspects, the lens 114 can define a frosted finish configured to "soften" and diffuse light emitted from the light engine 212. In other common designs, the trim piece must comprise a material such as metal to achieve satisfactory heat dissipation and fire retardation ratings. In some aspects, any or all of the trim piece 112, the lens 114, and the reflector 210 can comprise thermally conductive plastic. For example and without limitation, and additive can be added to the respective materials to promote heat conduction and cooling of the compartment 910.

It should be emphasized that the above-described embodiments are merely possible examples of implementations, merely set forth for a clear understanding of the principles of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A lighting assembly comprising:
    a reflector comprising a top reflector end and a bottom reflector end, the reflector defining a reflector bore extending through the reflector from the top reflector end to the bottom reflector end, the reflector bore defining a top reflector aperture and a bottom reflector aperture;
    a lens, attached to the reflector proximate the bottom reflector end, and covering the bottom reflector aperture;
    a backing plate; and
    a light engine, comprising a solid-state lighting ("SSL") source, a cover, and a printed circuit board ("PCB"), the SSL source attached to the PCB, the light engine covering the top reflector aperture, the SSL source disposed within the top reflector aperture, the SSL source configured to emit light through the lens, wherein the cover is directly attached to the backing plate and the PCB is arranged between the cover and the backing plate.

2. The lighting assembly of claim 1, wherein:
    the PCB is disposed within a cavity defined by the cover;
    the cover defines a light aperture extending through the cover;
    the light aperture is shaped and sized complimentary to the SSL source; and
    the light aperture receives the SSL source.

3. The lighting assembly of claim 2, wherein:
    the light engine is attached to the backing plate;
    the backing plate is attached to the top reflector end; and
    the PCB is enclosed between the cover and the backing plate.

4. The lighting assembly of claim 1, wherein:
    the lens, the reflector, and the light engine define a compartment; and
    the SSL source is dielectrically isolated within the compartment.

5. The lighting assembly of claim 1 further comprising a trim piece, wherein:
    the trim piece defines a top trim end and a bottom trim end;
    the trim piece defines a trim bore extending through the trim piece;
    the trim bore defines a top trim aperture disposed at the top trim end and a bottom trim aperture disposed at the bottom trim end; and
    the lens is disposed within the top trim aperture.

6. The lighting assembly of claim 5, wherein:
    the reflector defines a groove at the reflector bottom end;
    the trim piece defines a collar at the top trim end; and
    the groove receives the collar to secure the trim piece to the reflector.

7. The lighting assembly of claim 5, wherein:
    the trim piece defines a trim shoulder extending radially outward from the top trim aperture;
    the lens defines an outer circumferential surface and a lens shoulder extending radially inwards from the outer circumferential surface; and
    the trim shoulder engages the lens shoulder to secure the lens between the trim piece and the reflector.

8. The light assembly of claim 1, wherein the light engine further comprises other solid-state lighting ("SSL") sources, the PCB is enclosed between the cover and the backing plate with only the SSL source and the other SSL sources exposed through the cover.

9. The light assembly of claim 5, wherein the reflector is located between the light engine and the trim piece.

10. A method of manufacturing a lighting assembly, the method comprising:
    mounting a light engine to a backing plate, the light engine comprising a PCB and a cover, the cover directly attached to the backing plate and the PCB enclosed between the cover and the backing plate;
    attaching the backing plate to a top reflector end of a reflector, the light engine positioned between the backing plate and the reflector, the light engine comprising an SSL source configured to emit light, the SSL source aligned with a top reflector aperture of the reflector; and
    attaching a lens to a bottom reflector end of the reflector, the lens covering a bottom reflector aperture of the reflector, a reflector bore extending between the top reflector aperture and the bottom reflector aperture.

11. The method of claim 10, further comprising enclosing a compartment defined by the light engine, the reflector, and the lens, the SSL source disposed within the compartment.

12. The method of claim 11, further comprising attaching a trim piece to the bottom reflector end.

13. The method of claim 12, further comprising aligning the lens with a top trim aperture defined by the trim piece.

14. The method of claim 10, further comprising inserting a wing of the PCB into a connector notch of a PCB connector, the connector notch defined by a connector base of the PCB connector.

15. The method of claim 10, further comprising engaging a retention tab of the cover with the PCB, the retention tab configured to secure the PCB within a cavity defined by the cover.

16. The method of claim 10, wherein the light engine further comprises other solid-state lighting ("SSL") sources, the PCB is enclosed between the cover and the backing plate with only the SSL source and the other SSL sources exposed through the cover.

17. The method of claim 12, wherein the reflector is located between the light engine and the trim piece.

\* \* \* \* \*